(12) United States Patent
Maemura

(10) Patent No.: US 7,054,023 B2
(45) Date of Patent: May 30, 2006

(54) COMMUNICATION APPARATUS AND FACSIMILE APPARATUS

(75) Inventor: Kohichiroh Maemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 893 days.

(21) Appl. No.: 10/161,835

(22) Filed: Jun. 4, 2002

(65) Prior Publication Data

US 2003/0016400 A1    Jan. 23, 2003

(30) Foreign Application Priority Data

Jun. 8, 2001   (JP)   ............................. 2001-173897
Apr. 4, 2002   (JP)   ............................. 2002-102096

(51) Int. Cl.
*G06K 1/00*     (2006.01)

(52) U.S. Cl. ..................... 358/1.15; 358/442; 358/402; 358/498

(58) Field of Classification Search .............. 358/1.15, 358/442, 402, 500, 405, 498, 496, 468
See application file for complete search history.

(56) References Cited

U.S. PATENT DOCUMENTS

| | | | |
|---|---|---|---|
| 5,134,501 A | 7/1992 | Satomi et al. | |
| 5,159,465 A | 10/1992 | Maemura et al. | |
| 5,262,851 A | 11/1993 | Nakatani et al. | |
| 5,293,253 A | 3/1994 | Kida et al. | |
| 5,394,462 A | 2/1995 | Maemura | |
| 5,585,941 A | 12/1996 | Maemura | |
| 5,633,731 A | 5/1997 | Maemura | |
| 5,726,777 A * | 3/1998 | Yoshida et al. | 358/500 |
| 5,800,073 A * | 9/1998 | Matsuda et al. | 400/74 |
| 6,025,924 A | 2/2000 | Miura et al. | |
| 6,041,183 A | 3/2000 | Hayafune et al. | |
| 6,281,980 B1 | 8/2001 | Maemura et al. | |
| 6,301,014 B1 | 10/2001 | Miura et al. | |

FOREIGN PATENT DOCUMENTS

| | | |
|---|---|---|
| JP | 4-270547 | 9/1992 |
| JP | 9139799 | 5/1997 |
| JP | 9-193511 | 7/1997 |
| JP | 2000-59563 | 2/2000 |
| JP | 200078339 | 3/2000 |

* cited by examiner

OTHER PUBLICATIONS

Copy of U.S. Appl. No. 09/653,994 filed Sep. 1, 2000.

*Primary Examiner*—Kimberly Williams
*Assistant Examiner*—Negussie Worku
(74) *Attorney, Agent, or Firm*—Cooper & Dunham LLP

(57) ABSTRACT

A communication apparatus includes a registering part, a paper feeder, an information storing part, a selector, a recording part, and a recording controller. The registering part registers information of communication apparatuses to communicate with beforehand. The paper feeder includes a plurality of paper feed stages selectively feeding recording paper, at least one of the paper feed stages having recording paper different in color or material from the recording paper placed on the other paper feed stages. The information storing part stores information specifying the paper feed stage allocated for outputting a communication report for each of the communication apparatuses. The selector selects the specified paper feed stage. The recording part records information on the recording paper. The recording controller carries out a control to record by the recording part the communication report on the recording paper placed on the selected paper feed stage, when a communication error occurs or the communication is completed.

15 Claims, 10 Drawing Sheets

FIG.2

| TYPE | No. | NUMBER | NAME | IDENTIFICATION INFORMATION | PAPER FEED STAGE FOR TRANSMISSION COMPLETE REPORT | PAPER FEED STAGE FOR TRANSMISSION ERROR REPORT | PAPER FEED STAGE FOR RECEPTION ERROR REPORT |
|---|---|---|---|---|---|---|---|
| ONE-TOUCH | 01 | 046-222-2222 | KANAGAWA HEAD OFFICE | KANAGAWA HEAD OFFICE | 1 | NOT-SPECIFIED | NOT-SPECIFIED |
|  | 02 | 092-333-1234 | FUKUOKA BRANCH OFFICE | FUKUOKA BRANCH OFFICE | NOT-SPECIFIED | NOT-SPECIFIED | NOT-SPECIFIED |
|  | ... |  |  |  |  |  |  |
|  | 99 | 03-5355-6666 | SALES DEPARTMENT | SALES DEPARTMENT | NOT-SPECIFIED | NOT-SPECIFIED | NOT-SPECIFIED |
| ABBREVIATED DIALING | 00 | 045-876-5432 | ABC INC. | +81 45 876 5432 | NOT-SPECIFIED | 2 | 2 |
|  | 01 | 06-234-8585 | CED INC. | 06 234 8585 | NOT-SPECIFIED | NOT-SPECIFIED | NOT-SPECIFIED |
|  | ... |  |  |  |  |  |  |
|  | 99 | 001-1-093-987-6543 | XY Co., Ltd. | +1 93 987 6543 | 1 | 3 | 3 |

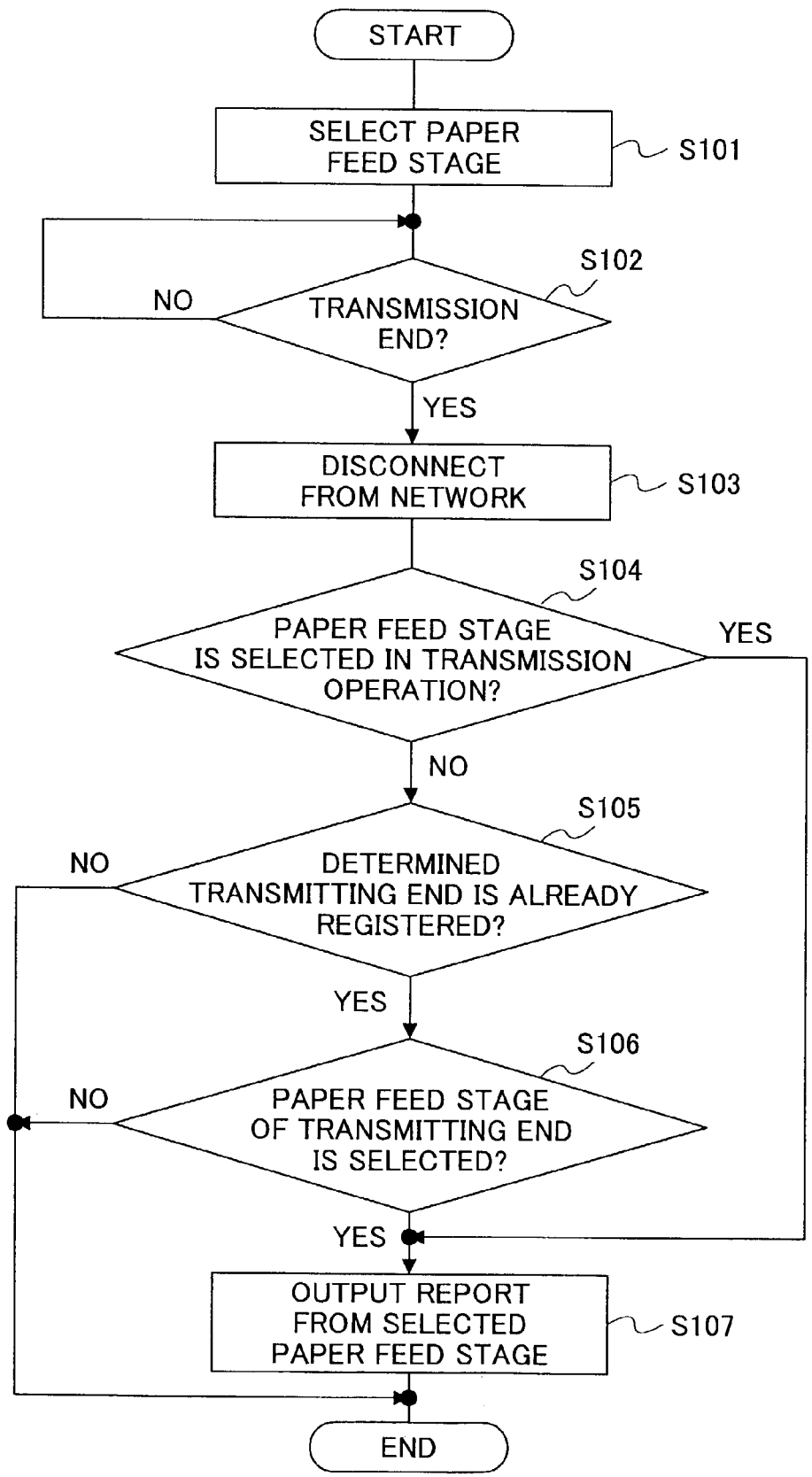

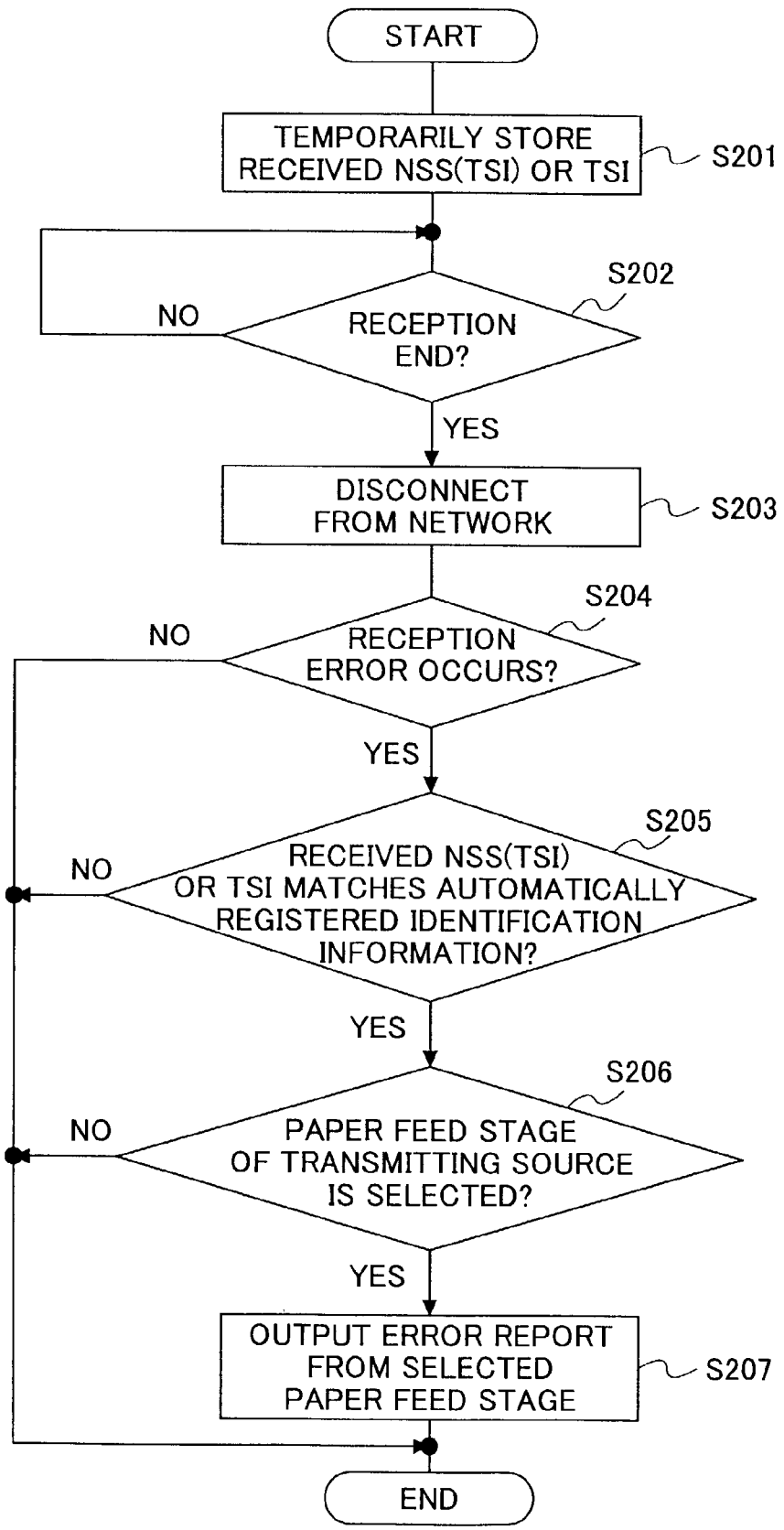

FIG.7

| TYPE | No. | TELEPHONE NUMBER/ E-MAIL ADDRESS/ IP ADDRESS | TRANSMITTING RESOUCE INFORMATION | PAPER FEED STAGE FOR TRANSMISSION COMPLETE REPORT | PAPER FEED STAGE FOR TRANSMISSION ERROR REPORT | PAPER FEED STAGE FOR RECEPTION ERROR REPORT | PRINTING COLOR FOR TRANSMISSION COMPLETE REPORT | PRINTING COLOR FOR TRANSMISSION ERROR REPORT | PRINTING COLOR FOR RECEPTION ERROR REPORT |
|---|---|---|---|---|---|---|---|---|---|
| ONE-TOUCH | 01 | 046-222-2222 | KANAGAWA HEAD OFFICE | 1 | NOT-SPECIFIED | NOT-SPECIFIED | NOT-SPECIFIED | NOT-SPECIFIED | NOT-SPECIFIED |
| | 02 | 092-333-1234 | FUKUOKA BRANCH OFFICE | NOT-SPECIFIED | NOT-SPECIFIED | NOT-SPECIFIED | NOT-SPECIFIED | RED | NOT-SPECIFIED |
| | ... | | | | | | | | |
| | 11 | def@ghi.co.jp | ↓ | NOT-SPECIFIED | NOT-SPECIFIED | NOT-SPECIFIED | NOT-SPECIFIED | RED | RED |
| | 12 | 123.456.321.654 | ↓ | 1 | NOT-SPECIFIED | NOT-SPECIFIED | BLUE | NOT-SPECIFIED | NOT-SPECIFIED |
| | ... | | | | | | | | |
| | 99 | 03-5355-6666 | SALES DEPARTMENT | NOT-SPECIFIED | NOT-SPECIFIED | NOT-SPECIFIED | NOT-SPECIFIED | NOT-SPECIFIED | RED |
| ABBREVIATED DIALING | 00 | 045-876-5432 | +81 45 876 5432 | NOT-SPECIFIED | 2 | 2 | NOT-SPECIFIED | NOT-SPECIFIED | NOT-SPECIFIED |
| | 01 | 06-234-8585 | 06 234 8585 | NOT-SPECIFIED | NOT-SPECIFIED | NOT-SPECIFIED | NOT-SPECIFIED | NOT-SPECIFIED | NOT-SPECIFIED |
| | ... | | | | | | | | |
| | 33 | jk@lmn.com | ↓ | NOT-SPECIFIED | NOT-SPECIFIED | 2 | NOT-SPECIFIED | NOT-SPECIFIED | NOT-SPECIFIED |
| | 34 | 135.531.888.999 | ↓ | NOT-SPECIFIED | NOT-SPECIFIED | NOT-SPECIFIED | BLUE | NOT-SPECIFIED | NOT-SPECIFIED |
| | ... | | | | | | | | |
| | 99 | 001-1-093-987-6543 | +1 93 987 6543 | 1 | 3 | 3 | NOT-SPECIFIED | NOT-SPECIFIED | NOT-SPECIFIED |

FIG.10

| TYPE OF TRANSMITTING SOURCE | INFORMATION SOURCE OF TRANSMITTING SOURCE |
|---|---|
| PSTN/PABX | NUMBER DISPLAY INFORMATION OR IDENTIFICATION INFORMATION STORED BY RECEIVING IN TRANSMISSION |
| IDSN | NOTIFICATION INFORMATION OF TRANSMITTING SOURCE |
| E-MAIL | E-MAIL ADDRESS OF TRANSMITTING SOURCE INCLUDED IN HEAD INFORMATION OF E-MAIL (VALUE IN "FROM" FIELD) |
| RI-FAX(IP ADDRESS) | IP ADDRESS TRANSMITTING SOURCE STORED IN IFP PACKET |

COMMUNICATION APPARATUS AND FACSIMILE APPARATUS

BACKGROUND OF THE INVENTION

1. Field of the Invention

The present invention generally relates to a communication apparatus and facsimile apparatus, and more particularly, to a communication apparatus and facsimile apparatus capable of selecting a printing color or a paper feed stage used by a recording part that outputs an error report or a transmission complete report, when transmitting to a specific transmitting destination, every time when a transmission is performed, and when receiving from a specific transmitting source.

2. Description of the Related Art

As prior art of selecting a paper feed unit that outputs a report, methods have been proposed in a Japanese Laid-Open Patent Application No. 9-139799 (referred to as "conventional method 1", hereinafter), and a Japanese Laid-Open Patent Application No. 2000-78339 (referred to as "conventional method 2", hereinafter). The conventional method 1 proposes a facsimile apparatus that prints out a report by feeding paper that is set when outputting the report. The conventional method 2 proposes a facsimile apparatus that determines whether or not a facsimile reception is made, and outputs the report by selecting recording paper used for normal output when it is determined that a facsimile reception is made.

However, in the above-mentioned conventional methods 1 and 2, a specific report is output on the recording paper fed from a specific paper feed unit irrespective of other party with which the communication is made. Thus, according to the conventional methods 1 and 2, it is impossible to distinguish a result (OK or NG (NG for not okay, or no good)) of important transmission to a specific transmitting destination or important reception from a specific transmitting source.

SUMMARY OF THE INVENTION

It is a general object of the present invention to provide an improved and useful communication apparatus and facsimile apparatus in which the above-mentioned problems are eliminated.

A more specific object of the present invention is to provide a communication apparatus and facsimile apparatus capable of selecting a printing color or a paper feed stage that is used for outputting a report reporting a result (OK or NG) when transmitting to a specific transmitting destination, when receiving from a specific transmitting source, or every time when a transmission is performed so that the result of transmitting important information and a reception error in receiving from an important transmitting source can be easily distinguished.

In order to achieve the above-mentioned objects, there is provided according to one aspect of the present invention, a communication apparatus that is connectable to at least one of a network and a public line and performs at least one of e-mail communication and data communication, and records a report indicating a result of the communication when a communication error occurs or the communication is completed, including: a registering part that registers information of a plurality of communication apparatuses to communicate with beforehand; a paper feeder that feeds recording paper and includes a plurality of paper feed stages selectively feeding recording paper, at least one of the paper feed stages having recording paper different in color or material from the recording paper placed on the other paper feed stages; an information storing part that stores information specifying the paper feed stage allocated for outputting a transmission error report for each of the communication apparatuses; a selector that selects the specified paper feed stage; a recording part that records information on the recording paper; and a recording controller that carries out a control to record by the recording part the transmission error report on the recording paper placed on the paper feed stage selected by the selector, so that the selected paper feed stage corresponding to the transmitting destination feeds the recording paper and the recording controller outputs the transmission error report on the recording paper when a transmission error occurs in the communication with the transmitting destination.

According to the above-mentioned aspect of the present invention, it is possible to select the paper feed stage that outputs an error report notifying a transmission error in transmission to a specific communication apparatus. For this reason, it is possible to easily distinguish the transmission error in communicating with an important transmitting destination.

Additionally, according to another aspect of the present invention, there is provided a communication apparatus that is connectable to at least one of a network and a public line and performs at least one of e-mail communication and data communication, and records a report indicating a result of communication when a communication error occurs or the communication is completed, including: a registering part that registers information of a plurality of communication apparatuses to communicate with beforehand; a paper feeder that feeds recording paper and includes a plurality of paper feed stages selectively feeding recording paper, at least one of the paper feed stages having recording paper different in color or material from the recording paper placed on the other paper feed stages; an information storing part that stores information specifying the paper feed stage allocated for outputting a transmission complete report for each of the communication apparatuses; a selector that selects the specified paper feed stage; a recording part that records information on the recording paper; and a recording controller that carries out a control to record by the recording part the transmission complete report on the recording paper placed on the selected paper feed stage selected by the selector, so that the selected paper feed stage corresponding to the transmitting destination feeds the recording paper and the recording controller outputs the transmission complete report on the recording paper when the communication with the transmitting destination succeeds.

According to the above-mentioned aspect of the present invention, it is possible to select the paper feed stage (or a paper feed unit) that outputs the transmission complete report notifying that transmission to a specific transmitting destination is completed. For this reason, it is possible to easily distinguish a transmission result of important information.

Additionally, according to another aspect of the present invention, there is provided a communication apparatus connectable to a network, including: a data communication part having a function of transmitting and receiving e-mail via said network; an address directory storing part that stores an address directory including address information of communication apparatuses to communicate with via the network, said address information including e-mail addresses and IP addresses of said communication apparatuses; a paper feeder that feeds a recording paper and includes a plurality of paper feed stages selectively feeding recording paper, at least one of the paper feed stages having recording paper different in color or material from the recording paper placed on the other paper feed stages; an information storing part that stores information specifying the paper feed stage allocated for outputting a reception error report for each of the communication apparatuses in the address directory; a comparing part that compares information of the transmitting source transmitted from the communication apparatus with which the communication is being established, and information of said transmitting source stored in said information storing part; a selector that selects the specified paper feed stage when both sets of information of the transmitting source match; a recording part that records information on the recording paper; and a recording controller that carries out a control to record by the recording part the reception error report on the recording paper placed on the selected paper feed stage selected by the selector, so that the selected paper feed stage corresponding to the transmitting source feeds the recording paper and the recording controller outputs the reception error report on the recording paper when a reception error occurs in communication with the communication apparatus and both sets of information of the transmitting source match.

According to the above-mentioned aspect of the present invention, it is possible to select the paper feed stage that outputs the reception error report notifying that the reception error occurs in reception from a specific transmitting source. For this reason, it is possible to provide a network communication apparatus with which the reception error in receiving from an important transmitting source can be easily distinguished.

Additionally, according to another aspect of the present invention, there is provided a communication apparatus connectable to a network, having a data communication function capable of transmitting and receiving e-mail via said network, and a function of transmitting and receiving facsimile data using a predetermined facsimile transmission procedure with a facsimile apparatus via a public line, including: an address directory storing part that stores an address directory including transmitting destination information, a transmitting destination, and identification information, said transmitting destination information being an e-mail address or an IP address of a transmitting destination to which the communication apparatus communicates via said network, said transmitting destination being a telephone number of a transmitting destination to which the communication apparatus communicates via a public line, and said identification information being identification information received from a transmitting destination when the communication apparatus calls the transmitting destination via said public line using said address directory; a paper feeder that feeds recording paper and includes a plurality of paper feed stages selectively feeding recording paper, at least one of the paper feed stages having recording paper different in color or material from the recording paper placed on the other paper feed stages; an information storing part that stores information specifying the paper feed stage allocated for outputting a reception error report for each facsimile apparatus in the address directory; a comparing part that compares said transmitting destination information transmitted from the facsimile apparatus with which communication is being established, and the transmitting destination information stored in said information storing part; a selector that selects the specified paper feed stage when both sets of transmitting destination information match; a recording part that records information on the recording paper; and a recording controller that carries out a control to record by the recording part the reception error report on the recording paper placed on the selected paper feed stage selected by the selector, so that the selected paper feed stage corresponding to the transmitting source feeds the recording paper and the recording controller outputs the reception error report on the recording paper when a reception error occurs in communication with the communication apparatus and both sets of transmitting destination information match.

According to the above-mentioned aspect of the present invention, it is possible to select the paper feed stage that outputs an error report notifying the reception error in receiving from a specific transmitting source. For this reason, it is possible to provide a network communication apparatus with which the reception error in receiving from an important transmitting source can be easily distinguished.

Additionally, according to another aspect of the present invention, there is provided a communication apparatus that is connectable to at least one of a network and a public line and performs at least one of e-mail communication and data communication, and records a report indicating a result of the communication when a communication error occurs or the communication is completed, including: a registering part that registers information of a plurality of communication apparatuses to communicate with beforehand; a recording part that prints on recording paper in one of a plurality of printing colors; an information storing part that stores information specifying said printing color allocated for recording a transmission error report for each of the communication apparatuses; a printing color selector that selects the specified printing color; and a recording controller that carries out a control to record by the recording part the transmission error report on recording paper with the printing color selected by said printing color selector, so that the recording controller records the transmission error report on the recording paper with the selected printing color corresponding to the transmitting destination when the transmission error occurs in communication with the communication apparatus.

According to the above-mentioned aspect of the present invention, it is possible to output an error report notifying the transmission error in transmitting to a specific transmitting destination with the selected printing color. For this reason, it is possible to easily distinguish the reception error in receiving from an important transmitting source.

Additionally, according to another aspect of the present invention, there is provided a communication apparatus that is connectable to at least one of a network and a public line and performs at least one of e-mail communication and data communication, and records a report indicating a result of the communication when a communication error occurs or the communication is completed, including: a registering part that registers information of a plurality of communication apparatuses to communicate with beforehand; a recording part that prints on recording paper in one of a plurality of printing colors; an information storing part that stores information specifying the printing color allocated for recording a transmission error report for each of the communication apparatuses; a printing color selector that selects the specified printing color; and a recording controller that carries out a control to record by the recording part the transmission error report on recording paper with the printing color selected by the printing color selector, so that the recording controller records the transmission error report on the recording paper with the selected printing color corresponding to the transmitting destination when the transmission error occurs in communication with the communication apparatus.

According to the above-mentioned aspect of the present invention, it is possible to output a transmission error report notifying a transmission error with a selected printing color. For this reason, it is possible to easily distinguish a transmission result of transmission of important information.

Additionally, according to another aspect of the present invention, there is provided a communication apparatus connectable to a network, including: a data communication part that transmits and receives e-mail via said network; an address directory storing part that stores an address directory including address information of a plurality of communication apparatuses to communicate with via the network, said address information including an e-mail address or an IP address of said communication apparatuses; a recording part that prints on recording paper in one of a plurality of printing colors; an information storing part that stores information specifying said printing color allocated for recording a reception error report for each of the communication apparatuses in the address directory; a comparing part that compares transmitting source information transmitted from the communication apparatuses with which the communication is being established, and transmitting source information of the communication apparatus stored in the information storing part; a printing color selector that selects the specified printing color when both sets of transmitting source information match; and a recording controller that carries out a control to record by the recording part the reception error report on recording paper with the printing color selected by said printing color selector, so that the recording controller records the reception error report on the recording paper with the selected printing color corresponding to the communication apparatus when a reception error occurs when communicating with the communication apparatus and both sets of transmitting source information match.

According to the above-mentioned aspect of the present invention, it is possible to output the reception error report notifying a reception error in receiving from a specific transmitting source with a selected printing color. For this reason, it is possible to provide a network communication apparatus with which the reception error in receiving from an important transmitting source can be easily distinguished.

Additionally, according to another aspect of the present invention, there is provided a communication apparatus connectable to a network, having a data communication function capable of transmitting data such as e-mail via said network, and a function of transmitting and receiving facsimile data using a predetermined facsimile transmission procedure with a facsimile apparatus via a public line, including: an address directory storing part that stores an address directory including transmitting destination information, a transmitting destination and identification information, said transmitting destination information being an e-mail address or an IP address of a transmitting destination to which the communication apparatus communicates via said network, said transmitting destination being a telephone number of a transmitting destination to which the communication apparatus communicates via a public line, and said identification information being identification information received from a transmitting destination when the communication apparatus calls the transmitting destination via said public line using said address directory; a recording part that prints on recording paper in one of a plurality of printing colors; an information storing part that stores information specifying said printing color allocated for outputting a reception error report for each facsimile apparatus in the address directory; a comparing part that compares transmitting source information transmitted from the facsimile apparatus with which the communication is being established, with transmitting source information of the facsimile apparatus stored in said information storing part; a printing color selector that selects the specified printing color when both sets of transmitting source information match; and a recording controller that carries out a control to record by the recording part the reception error report on recording paper with the printing color selected by said printing color selector, so that the recording controller records the reception error report on the recording paper with the selected printing color corresponding to the facsimile apparatus when a reception error occurs when communicating with the facsimile apparatus and both sets of transmitting source information match.

According to the above-mentioned aspect of the present invention, it is possible to output the reception error report notifying a reception error in receiving from a specific transmitting source with a selected printing color. For this reason, it is possible to provide a network communication apparatus with which a reception error in receiving from an important transmitting source can be easily distinguished.

Additionally, according to another aspect of the present invention, there is provided a facsimile apparatus that is connectable to at least one of a network and a public line and performs at least one of e-mail communication and data communication, and records a report indicating a result of the communication when a communication error occurs or the communication is completed, including: a registering part that registers identification information of a plurality of facsimile apparatuses so that the facsimile apparatus corresponds to a predetermined calling number; a first information storing part that stores information of a transmitting source received from the transmitting source by dialing the calling number; a paper feeder that feeds a recording paper and includes a plurality of paper feed stages selectively feeding recording paper, at least one of the paper feed stages having the recording paper different in color or material from the recording paper placed on the other paper feed stages; a second information storing part that stores information specifying the paper feed stage allocated for outputting a reception error report for each of the facsimile apparatuses; a comparing part that compares transmitting source information transmitted from the facsimile apparatus with which the communication is established, with transmitting source information of the facsimile apparatus stored in the second information storing part; a selector that selects the specified paper feed stage when both sets of transmitting source information match; a recording part that records information on the recording paper; and a recording controller that carries out a control to record by the recording part the reception error report on the recording paper on the paper feed stage selected by the selector, so that the selected paper feed stage corresponding to the transmitting source feeds the recording paper and the recording controller outputs the reception error report on the recording paper when a reception error occurs in the communication with the facsimile apparatus and both sets of transmitting source information match.

According to the above-mentioned aspect of the present invention, it is possible to select the paper feed stage that outputs the reception error report in receiving from a specific transmitting source. For this reason, it is possible to provide a facsimile apparatus with which a reception error in receiving from an important transmitting source can be easily distinguished.

Additionally, according to another aspect of the present invention, there is provided a facsimile apparatus that is connectable to either a network or a public line and performs either e-mail communication or data communication, and records a report indicating a result of communication when a communication error occurs, including: a registering part that registers identification information of a plurality of facsimile apparatuses such that each of the facsimile apparatuses corresponds to a predetermined calling number; a recording part that prints on recording paper in one of a plurality of printing colors; an information storing part that stores information specifying said printing color allocated for outputting a reception error report for each of the facsimile apparatuses; a comparing part that compares transmitting source information transmitted from the facsimile apparatus with the identification information of the facsimile apparatus stored in said information storing part; a printing color selector that selects the specified printing color when both sets of information match; and a recording controller that carries out a control to record by the recording part the reception error report on recording paper with the printing color selected by said printing color selector, so that the recording controller records the reception error report on the recording paper with the selected printing color corresponding to the facsimile apparatus when a reception error occurs in communication with the facsimile apparatus and said transmitting source information and said identification information match.

According to the above-mentioned aspect of the present invention, it is possible to output the reception error report notifying a reception error in receiving from a specific transmitting source with a selected printing color. For this reason, it is possible to provide a facsimile apparatus with which a reception error in receiving from an important transmitting source can be easily distinguished.

Additionally, according to another aspect of the present invention, there is provided a communication apparatus that is connectable to at least one of a network and a public line and performs at least one of e-mail communication and data communication, and records a report by selecting a paper feed stage or a printing color depending on a result of the communication, including: a registering part that registers information of a plurality of communication apparatuses to communicate with beforehand; a paper feeder that feeds recording paper and includes a plurality of paper feed stages selectively feeding recording paper, at least one of the paper feed stages having recording paper different in color or material from the recording paper placed on the other paper feed stages; an information storing part that stores information specifying the paper feed stage or the printing color allocated for outputting said report for each of the communication apparatuses;,a selector that selects the specified paper feed stage or the specified printing color; a recording part that prints on the recording paper from the specified paper feed stage selected by said selector or in the specified printing color selected by said selector; and a recording controller that carries out a control to record by the recording part the report on the recording paper selected by the selector or with the printing color selected by the selector.

According to the above-mentioned aspect of the present invention, it is possible to output a report notifying a result of communication on recording paper on a selected paper feed stage or with a selected printing color. For this reason, it is possible to provide a communication apparatus with which a result of communication with an important party can be easily distinguished.

Other objects, features and advantages of the present invention will become more apparent from the following detailed description when read in conjunction with the following drawings.

BRIEF DESCRIPTION OF THE DRAWINGS

FIG. 2 is a table showing an example of information stored in a RAM according to the first embodiment;

FIG. 3 is a flow chart for explaining a transmitting operation of the facsimile apparatus according to the first embodiment;

FIG. 4 is a flow chart for explaining a receiving operation of the facsimile apparatus according to the first embodiment of the present invention;

FIG. 7 is a table showing examples of information stored in a RAM according to the second embodiment;

FIG. 10 is a table showing examples of information for each type of transmitting source in the first and the second embodiments.

DETAILED DESCRIPTION OF THE PREFERRED EMBODIMENTS

A communication apparatus according to the present invention includes a registering part, a paper feeder, an information storing part, a selector, and a recording controller. The registering part registers information of the other party, that is, transmitting sources and transmitting destinations. The paper feeder includes a plurality of paper feed stages (or paper feed units). The paper feed stages can selectively feed recording paper. Additionally, at least one of the paper feed stages uses recording paper different in color, material or the like from recording paper placed on the other paper feed stages. The information storing part stores information that specifies the paper feed stage allocated for outputting a report for each of the transmitting sources and transmitting destinations. The selector selects the specified paper feed stage. The recording controller records the report reporting a result of communication on the recording paper placed on the paper feed stage selected by the selector. As results of communication, there are a communication error and a transmission completion, for example. The communication error includes a transmission error, a reception error, and the like. It should be noted that the report includes a transmission error report, a reception error report, a transmission complete report, and the like.

Figure 1:
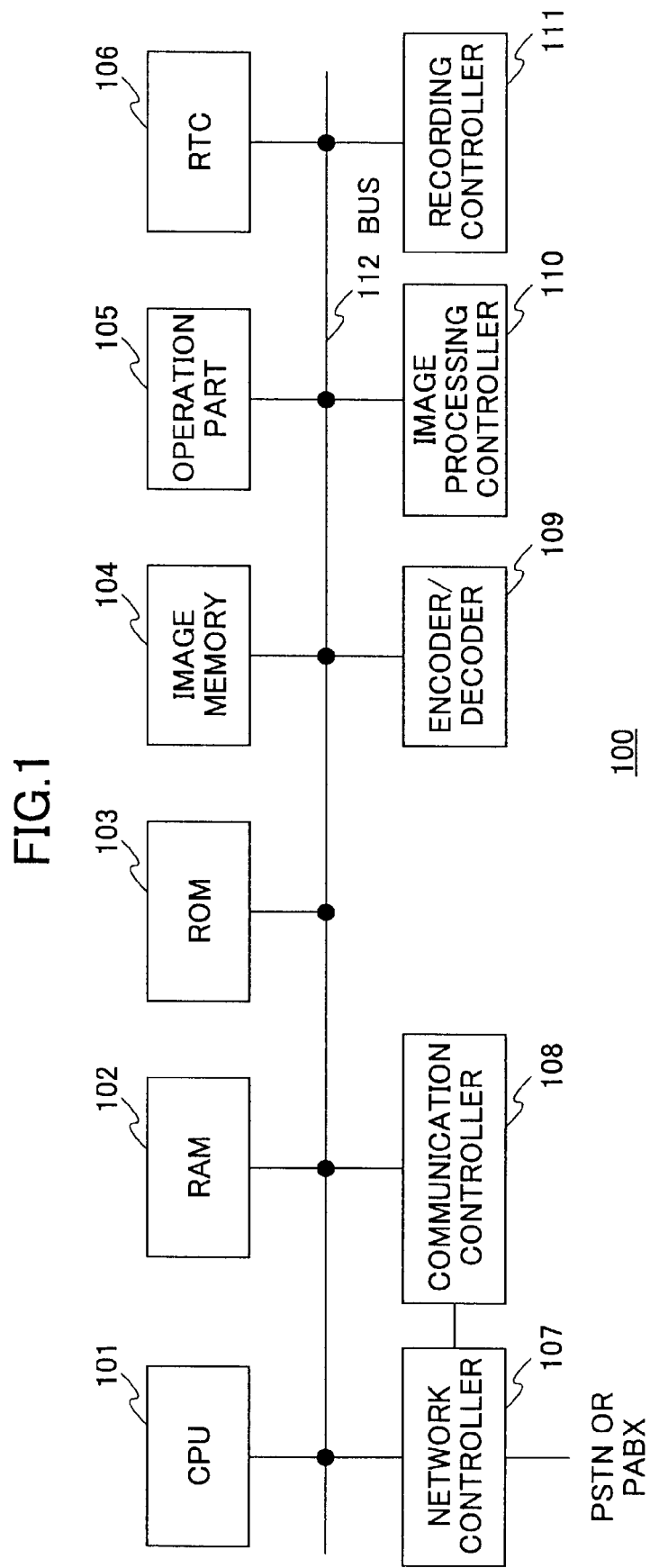
FIG. 1 is a block diagram showing the structure of a facsimile apparatus according to a first embodiment of the present invention.

FIG. 1 is a block diagram showing the structure of a facsimile apparatus 100 according to a first embodiment of the present invention. The facsimile apparatus 100 includes a CPU 101, a RAM 102, ROM 103, image memory 104, an operation part 105, an RTC 106, a network controller 107, a communication controller 108, an encoder/decoder 109, an image processing controller 110, a recording controller 111, these components being mutually connected via a bus 112. The CPU 101 controls each of the above-mentioned components. The RAM 102 stores telephone numbers corresponding to one-touch keys and abbreviated dialing numbers, an identification information storing area, a paper feed stage storing area, and a temporary storing area. The identification information storing area automatically stores identification information of the transmitting destinations in transmission. The paper feed stage storing area stores information of the transmitting destinations, transmitting sources and the paper feed stages to be selected when outputting the communication reports. The temporary storing area temporarily stores information In addition, nonvolatile memory is used for the RAM 102 as the occasion demands. The ROM 103 stores programs for controlling the entire facsimile apparatus 100, and also message data that are to be written on the transmission complete reports and error reports. The image memory 104 temporarily stores image data. The operation part 105 has the one-touch keys, abbreviated dialing numbers and the like. The RTC 106 generates a control return code. The network controller 107 controls communication with the network. The recording controller 111 performs paper feed stage selection control for selecting recording paper from the paper feed stages, for printing out the reports.

FIG. 2 shows an example of information stored in the RAM 102. That is, the telephone numbers corresponding to one-touch keys and abbreviated dialing numbers, information in the identification information storing area, and information in the paper feed stage storing area. In FIG. 2, "not specified" refers to a case where a default paper feed stage is selected for outputting the reports. Further, the recording paper placed in each of the paper feed stages may be any kind of paper, such as colored paper, figured paper, slick paper, fragrant paper, underprinted paper, translucent paper, transparent paper, and the like. Also, the recording paper may be a combination of the above-mentioned kinds of paper.

Next, referring to FIGS. 3 and 4, a description will be given of the operation of the facsimile apparatus having the structure shown in FIG. 1 according to this embodiment.

FIG. 3 is a flow chart for explaining the transmitting operation of the facsimile apparatus. First, prior to transmission, step S101 selects the paper feed stage. It should be noted that in this embodiment, a case is shown where the paper feed stage selected in the transmission operation is given priority over the paper feed stage that is specified according to attributes of the transmitting destination and is stored in the paper feed stage storing area of RAM 102. Additionally, in this case, the transmission complete report is always output when completing the transmission. However, the attributes of the transmitting destination stored in the RAM 102 may be given priority over the selection in the transmission operation. Furthermore, the selection in each transmission operation may be made possible only when the transmitting destination is determined by directly inputting a telephone number. Also, another setting may be applied so that the transmission complete report is not output when the transmission completes.

Next, step S102 decides whether or not the transmission ends. If the decision result in step S102 is YES, the facsimile apparatus is disconnected from the network in step S103.

Step S102 is repeated until it is determined that the transmission ends. Then, step S104 decides whether or not the paper feed stage is selected in the transmission operation referring to memory contents of the RAM 102 as shown in FIG. 2. If the decision result in step S104 is YES, the operation proceeds to step S107. Step S107 outputs a report on the recording paper placed on the selected paper feed stage by a print head. The print head may be similar to that of a recording part according to a second embodiment of the present invention that will be described later, for example. On the other hand, if the decision result in step S104 is NO, the operation proceeds to step S105. Step S105 decides whether or not the determined transmitting destination is already registered in the RAM 102. If the decision result in step S105 is YES, the operation proceeds to'step S106. Step S106 decides whether or not the paper feed stage corresponding to the determined transmitting destination is set. Referring to the memory contents of the RAM 102, if the decision result in step S106 is YES, step S107 outputs the report by using the recording paper on the paper feed stage that is selected. On the other hand, when the decision result in step S105 is NO, the report is output by using the recording paper on the default paper feed stage. Additionally, if the decision result in step S106 is NO, the report is also output by using the recording paper in the default paper feed stage.

FIG. 4 is a flow chart for explaining the receiving operation of the facsimile apparatus of the first embodiment. First, step S201 temporarily stores identification information of the transmitting source of received data. Step S202 decides whether or not the reception ends. If the decision result in step S202 is YES, the facsimile apparatus is disconnected from the network in step 5203. Step S202 is repeated until it is decided that the reception ends. Next, S204 decides whether or not a reception error occurs. If the decision result in step S204 is YES, the operation proceeds to step S205. Step S205 decides whether or not received identification signals include identification information that matches identification information that has been automatically registered in a previous transmission. If the decision result in step S205 is YES, the operation proceeds to step S206. Referring to the memory contents of the RAM 102 as shown in FIG. 2, step S206 decides whether or not the paper feed stage of the transmitting source is selected. If the decision result in step S206 is YES, the error report is output by using the recording paper on the selected paper feed stage. On the other hand, if the decision result in step S204 is NO, the reception error report is output by using the recording paper on a default paper feed stage. If the decision result in step S205 is NO, the reception error report is also output by using the recording paper in the default paper feed stage. Further, if the decision result in step S206 is NO, the reception error report is also output by using the recording paper in the default paper feed stage.

As mentioned above, according to the first embodiment of the present invention, it is possible to select the paper feed stage that outputs a report for reporting NG or OK when transmitting to a specific transmitting destination, when receiving from a specific transmitting source, or every time when performing the transmission operation. In other words, it is possible to record the report on desired recording paper depending on a result of communication. Hence, it is possible to easily distinguish a transmission result when transmitting important information and a reception error when receiving from an important transmitting source.

Figure 5:
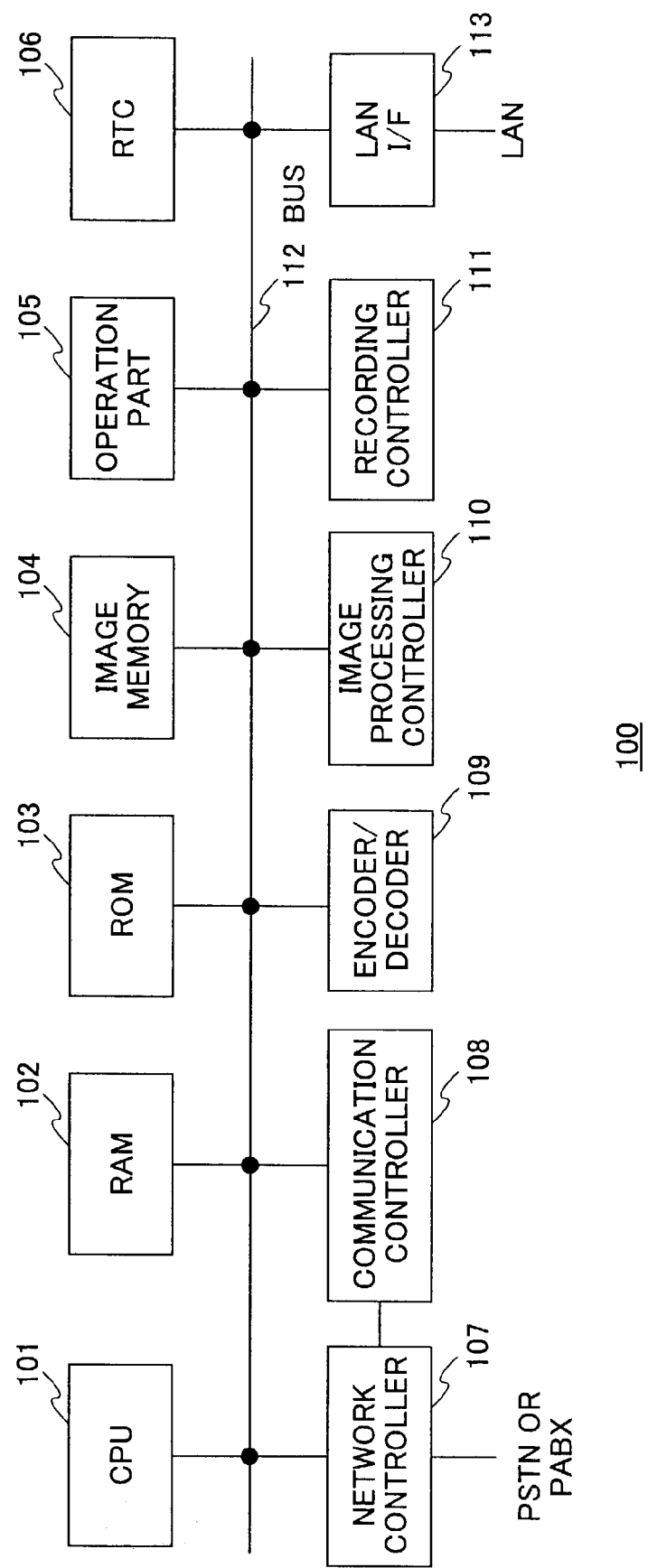
FIG. 5 is a block diagram showing the structure of a facsimile apparatus according to a second embodiment of the present invention.

FIG. 5 is a block diagram showing the structure of a facsimile apparatus 100 according to a second embodiment of the present invention. In FIG. 5, those components that are the same as those corresponding components in FIG. 1 are designated by the same reference numerals, and a description thereof will be omitted. The facsimile apparatus 100 of this embodiment is different from the facsimile apparatus 100 of the first embodiment in further including a LAN I/F 113 that performs communication via a network.

Figure 6:
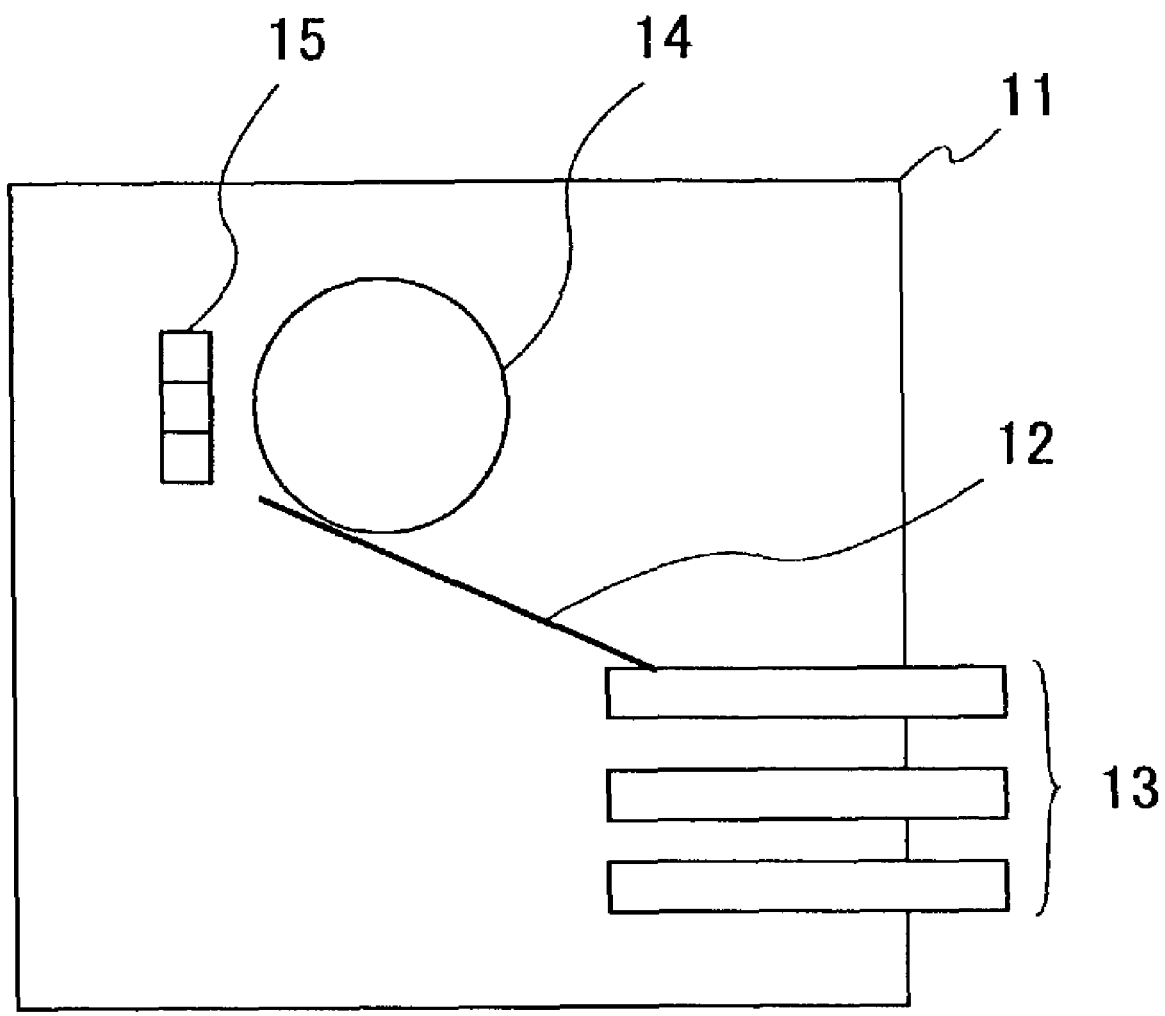
FIG. 6 is a schematic cross-sectional view showing the structure of recording means in the facsimile apparatus according to the second embodiment.

FIG. 6 is a schematic diagram showing recording means 11. The recording means 11 is provided inside the facsimile apparatus 100, and includes a recording paper feeder 13, a platen part 14, and print heads 15 of red, blue and green. Each paper feed stage of the recording paper feed part 13 uses recording paper 12 corresponding to the kinds of the reports. The recording means 11 is controlled by the recording controller 111 such that the recording means 11 selects the paper feed stage of the recording paper feed part 13 as in the above-mentioned first embodiment, or forms an image on the recording paper by selecting one of a plurality of printing colors of the print heads 15.

Further, FIG. 7 shows examples of information stored in RAM 102 shown in FIG. 5. That is, telephone numbers corresponding to one-touch keys and abbreviated dialing numbers, and information in an identification information storing area, a paper feed stage storing area, and a printing color storing area. The identification information storing area automatically stores identification information of a transmitting destination in corresponding transmission. The paper feed stage storing area stores information of the paper feed stages to be used for feeding the recording paper for outputting the reports. The printing color storing area stores information of the printing colors to be used for printing out the reports. It should be noted that, in FIG. 7, "not specified" refers to a case where a default paper feed stage is selected, or where black color printing is selected Additionally, the print heads 15 may be nozzles provided with ink of a variety of colors. Further, the print heads 15 may be a monochrome laser recording apparatus, monochrome electrophotographic recording apparatus, or monochrome thermal-transfer recording apparatus, for example, provided that the recording means 11 includes a plurality of paper feed stages. In addition, in a case where only a single paper feed stage is provided, the print heads 15 may be a color laser recording apparatus, color electrophotographic recording apparatus, or color thermal-transfer recording apparatus, for example.

Next, referring to FIGS. 8 and 9, a description will be given of the operations of the facsimile apparatus having the structure shown in FIG. 5 according to the second embodiment. It should be noted that, in FIG. 8, a transmitting operation includes cases where the paper feed stage is selected every time when the transmission operation is performed, and where the paper feed stage is selected according to attributes of transmitting destinations that are stored in a RAM 102 beforehand.

Figure 8:
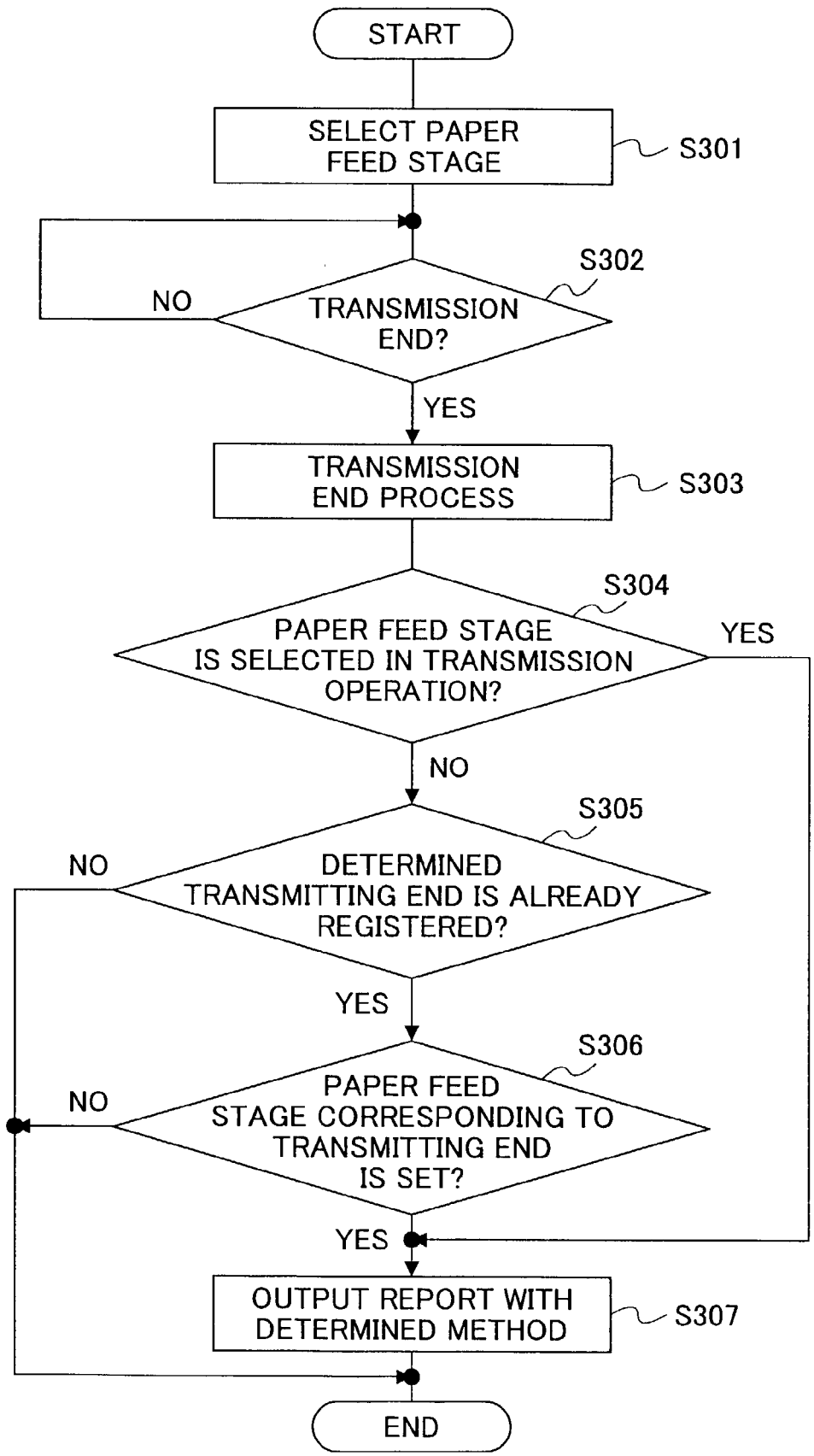
FIG. 8 is a flow chart for explaining a transmitting operation of the facsimile apparatus according to the second embodiment.

FIG. 8 is a flow chart for explaining the transmission operation of the facsimile apparatus of this embodiment. First, prior to transmission, step S301 selects the paper feed stage. It should be noted that, also in this embodiment, the case is shown where the paper feed stage selected in the transmission operation is given priority over the paper feed stage that is specified according to the attributes of the transmitting destination and stored in the RAM 102. Additionally, in this case, the transmission complete report is always output when completing the transmission. However, the attributes of the transmitting destinations stored in the RAM 12 may be given priority over the selection in the transmission operation. Furthermore, selection in the transmitting operation may be made only when the transmitting destination is determined by directly inputting a telephone number. Also, another setting may be applied so that the transmission complete report is not output when the transmission completes. Step S302 decides whether or not the transmission ends. Step S302 is repeated until it is determined that the transmission ends.

Next, if the decision result in step S302 is YES, a transmission end process is performed in step S303. Step S304 decides whether or not the paper feed stage for feeding the recording paper to output the report is selected in the transmission operation, referring to the memory contents in the RAM 102 as shown in FIG. 7. If the decision result in step S304 is YES, the report is output according to the determined method in step S307. That is, the report is output by using the paper on the selected paper feed stage as the above-mentioned first embodiment, or by using the selected printing color. On the other hand, if the decision result in step S304 is NO, step S305 decides whether or not the determined transmitting destination has been already registered, referring to the memory contents in the RAM 102 as, shown in FIG. 7. If the decision result in step S305 is YES, step S306 decides whether or not the paper feed stage corresponding to the determined transmitting destination is selected. Referring to the memory contents in the RAM 102 as shown in FIG. 7, if the decision result in step S306 is YES, the operation proceeds to step S307.

On the other hand, if the decision result in step S305 is NO, the report is output by using paper in a default paper feed stage, or by using black ink for the printing color. Further, if the decision result in step S306 is NO, the report is also output by using the paper in the default paper feed stage, or by using the black ink for the printing color.

Figure 9:
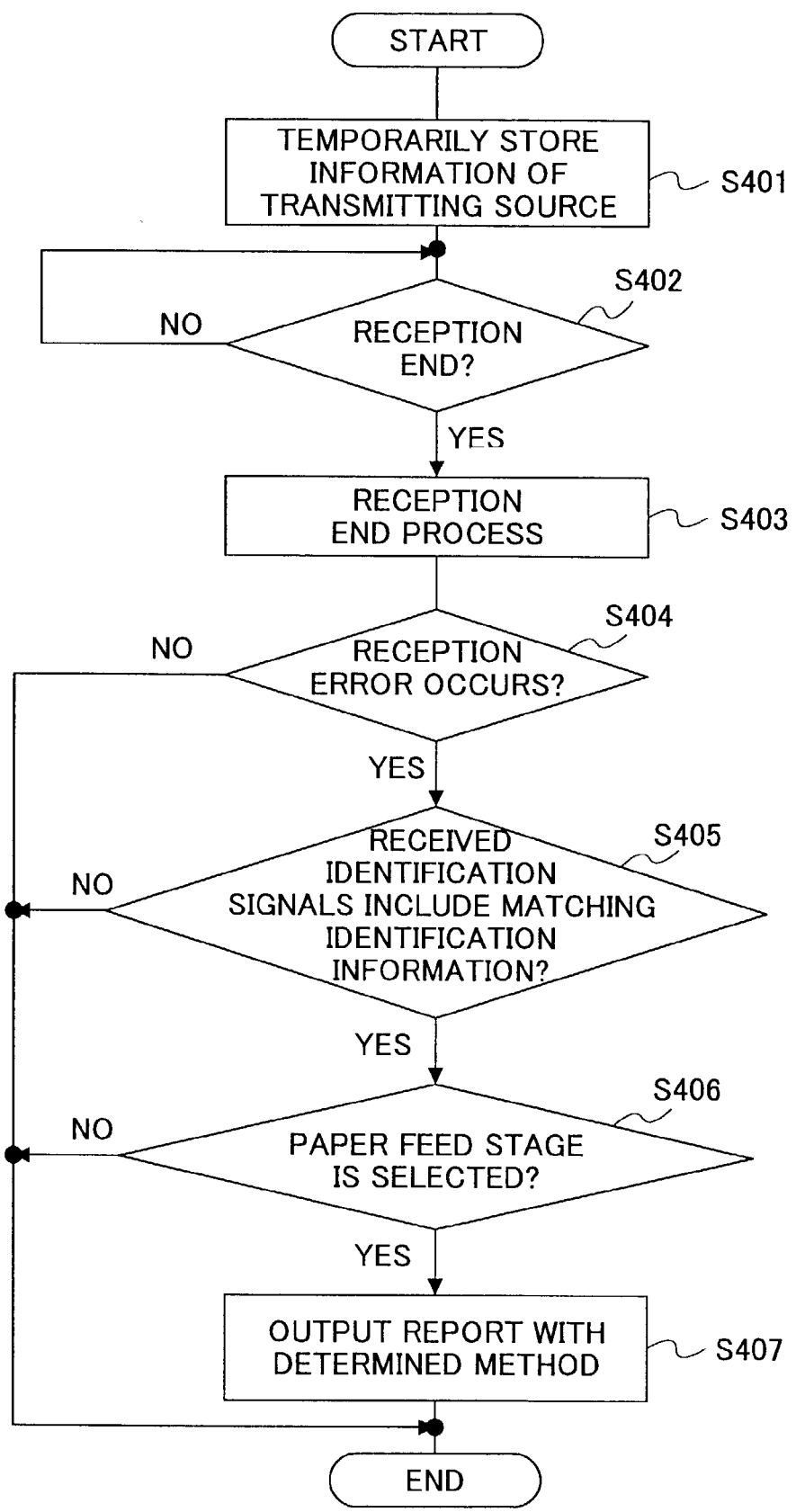
FIG. 9 is a flow chart for explaining an receiving operation of the facsimile apparatus according to the second embodiment.

FIG. 9 is a flow chart for explaining the reception operation of the facsimile apparatus of this embodiment. First, step S401 temporarily stores received identification information of a transmitting source. Step S402 decides whether the reception ends. If the decision result in step S402 is YES, a reception end process is performed in step S403. Then, step S404 decides whether or not a reception error occurs. If the decision result in step S404 is YES, the operation proceeds to step S405. Step S405 decides whether or not the received identification signals includes identification information that matches the identification information automatically registered in the previous transmission. If the decision result in step S405 is YES, the operation proceeds to step S406. Referring to the memory contents in the RAM 102 as shown in FIG. 7, step S406 decides whether or not the paper feed stage is selected for feeding paper for outputting the reception error report of the transmitting destination. If the decision result in step S406 is YES, the reception error report is output according to a determined method in step S407. That is, the reception error report is output by using the paper in the selected paper feed stage as the above-mentioned first embodiment, or by using the selected printing color.

On the other hand, the reception error report is output by using paper in a default paper feed stage, or by using the black ink for the printing color in the following cases: a case where it is decided that the reception error has not occurred (NO in step S404), a case where it is determined that the received identification signals do not include the matching identification information (NO in step S405), and a case where it is determined that the paper feed stage is not selected (NO in step S406).

As mentioned above, according to the second embodiment of the present invention, it is possible to select the printing color, or the paper feed stage that outputs a report for notifying NG or OK when transmitting to a specific transmitting destination, when receiving from a specific transmitting source, or every time when performing the transmission operation. In other words, it is possible to record the report with a desired printing color depending on a result of communication. Accordingly, it is possible to easily distinguish a transmission result of transmitting important information, or a reception error in receiving from an important transmitting source.

FIG. 10 is a table showing examples of information sources of the transmitting sources for each type of transmitting source in the first and the second embodiments. When receiving a facsimile transmission, the transmitting source is identified according to the information sources of transmitting sources as shown in FIG. 10. A method of identifying the transmitting source is switched depending on the channel that is used in a case where communication is performed via a network as well as a case where the communication is performed via a public line. Therefore, it is possible to provide a reception error identifying function that corresponds to various communication channels and can easily distinguish an error. In FIG. 10, one-touch and abbreviated dialing may be used as types of transmitting source, however, not only a local address directory but also an address directory formed on a some kind of database connected to the network may be used.

The present invention is not limited to the specifically disclosed embodiments, and variations and modifications may be made without departing from the scope of the present invention.

The present application is based on Japanese priority applications No. 2001-173897 filed on Jun. 8, 2001, and No. 2002-102096 filed on Apr. 4, 2002, the entire contents of which are hereby incorporated by reference.

What is claimed is:

1. A communication apparatus that is connectable to at least one of a network and a public line and performs at least one of e-mail communication and data communication, and records a report indicating a result of the communication when a communication error occurs or the communication is completed, comprising:
    a registering part that registers information of a plurality of communication apparatuses to communicate with beforehand;
    a paper feeder that feeds recording paper and includes a plurality of paper feed stages selectively feeding recording paper, at least one of the paper feed stages having recording paper different in color or material from the recording paper placed on the other paper feed stages;
    an information storing part that stores information specifying the paper feed stage allocated for outputting a transmission error report for each of the communication apparatuses;
    a selector that selects the specified paper feed stage;
    a recording part that records information on the recording paper; and
    a recording controller that carries out a control to record by the recording part the transmission error report on the recording paper placed on the paper feed stage selected by the selector, so that the selected paper feed stage corresponding to the transmitting destination feeds the recording paper and the recording controller outputs the transmission error report on the recording paper when a transmission error occurs in the communication with the transmitting destination.

2. The communication apparatus as claimed in claim 1, wherein the recording controller selects the paper feed stage that feeds the recording paper when outputting the transmission error report every time when a transmission operation is performed.

3. A communication apparatus that is connectable to at least one of a network and a public line and performs at least one of e-mail communication and data communication, and records a report indicating a result of communication when a communication error occurs or the communication is completed, comprising:
    a registering part that registers information of a plurality of communication apparatuses to communicate with beforehand;
    a paper feeder that feeds recording paper and includes a plurality of paper feed stages selectively feeding recording paper, at least one of the paper feed stages having recording paper different in color or material from the recording paper placed on the other paper feed stages;
    an information storing part that stores information specifying the paper feed stage allocated for outputting a transmission complete report for each of the communication apparatuses;
    a selector that selects the specified paper feed stage;
    a recording part that records information on the recording paper; and
    a recording controller that carries out a control to record by the recording part the transmission complete report on the recording paper placed on the selected paper feed stage selected by the selector, so that the selected paper feed stage corresponding to the transmitting destination feeds the recording paper and the recording controller outputs the transmission complete report on the recording paper when the communication with the transmitting destination succeeds.

4. The communication apparatus as claimed in claim 3, wherein the recording controller selects the paper feed stage that feeds the recording paper when outputting the transmission complete report every time when a transmission operation is performed.

5. A communication apparatus connectable to a network, comprising:
    a data communication part having a function of transmitting and receiving e-mail via said network;
    an address directory storing part that stores an address directory including address information of communication apparatuses to communicate with via the network, said address information including e-mail addresses and IP addresses of said communication apparatuses;
    a paper feeder that feeds a recording paper and includes a plurality of paper feed stages selectively feeding recording paper, at least one of the paper feed stages having recording paper different in, color or material from the recording paper placed on the other paper feed stages;
    an information storing part that stores information specifying the paper feed stage allocated for outputting a reception error report for each of the communication apparatuses in the address directory;
    a comparing part that compares information of the transmitting source transmitted from the communication apparatus with which the communication is being established, and information of said transmitting source stored in said information storing part;

a selector that selects the specified paper feed stage when both sets of information of the transmitting source match;

a recording part that records information on the recording paper; and a recording controller that carries out a control to record by the recording part the reception error report on the recording paper placed on the selected paper feed stage selected by the selector, so that the selected paper feed stage corresponding to the transmitting source feeds the recording paper and the recording controller outputs the reception error report on the recording paper when a reception error occurs in communication with the communication apparatus and both sets of information of the transmitting source match.

6. A communication apparatus connectable to a network, having a data communication function capable of transmitting and receiving e-mail via said network, and a function of transmitting and receiving facsimile data using a predetermined facsimile transmission procedure with a facsimile apparatus via a public line, comprising:

an address directory storing part that stores an address directory including transmitting destination information, a transmitting destination, and identification information, said transmitting destination information being an e-mail address or an IP address of a transmitting destination to which the communication apparatus communicates via said network, said transmitting destination being a telephone number of a transmitting destination to which the communication apparatus communicates via a public line, and said identification information being identification information received from a transmitting destination when the communication apparatus calls the transmitting destination via said public line using said address directory;

a paper feeder that feeds recording paper and includes a plurality of paper feed stages selectively feeding recording paper, at least one of the paper feed stages having recording paper different in color or material from the recording paper placed on the other paper feed stages;

an information storing part that stores information specifying the paper feed stage allocated for outputting a reception error report for each facsimile apparatus in the address directory;

a comparing part that compares said transmitting destination information transmitted from the facsimile apparatus with which communication is being established, and the transmitting destination information stored in said information storing part;

a selector that selects the specified paper feed stage when both sets of transmitting destination information match;

a recording part that records information on the recording paper; and a recording controller that carries out a control to record by the recording part the reception error report on the recording paper placed on the selected paper feed stage selected by the selector, so that the selected paper feed stage corresponding to the transmitting source feeds the recording paper and the recording controller outputs the reception error report on the recording paper when a reception error occurs in communication with the communication apparatus and both sets of transmitting destination information match.

7. A communication apparatus that is connectable to at least one of a network and a public line and performs at least one of e-mail communication and data communication, and records a report indicating a result of the communication when a communication error occurs or the communication is completed, comprising:

a registering part that registers information of a plurality of communication apparatuses to communicate with beforehand;

a recording part that prints on recording paper in one of a plurality of printing colors;

an information storing part that stores information specifying said printing color allocated for recording a transmission error report for each of the communication apparatuses;

a printing color selector that selects the specified printing color; and a recording controller that carries out a control to record by the recording part the transmission error report on recording paper with the printing color selected by said printing color selector, so that the recording controller records the transmission error report on the recording paper with the selected printing color corresponding to the transmitting destination when the transmission error occurs in communication with the communication apparatus.

8. The communication apparatus as claimed in claim 7, wherein the recording controller sets the printing color used for outputting the transmission error report when the transmission error occurs every time when a transmission operation is performed.

9. A communication apparatus that is connectable to at least one of a network and a public line and performs at least one of e-mail communication and data communication, and records a report indicating a result of the communication when a communication error occurs or the communication is completed, comprising:

a registering part that registers information of a plurality of communication apparatuses to communicate with beforehand;

a recording part that prints on recording paper in one of a plurality of printing colors;

an information storing part that stores information specifying said printing color allocated for printing a transmission complete report for each of the communication apparatuses;

a printing color selector that selects the specified printing color;

a recording controller that carries out a control to record by the recording part the transmission complete report on recording paper with the printing color selected by said printing color selector, so that the recording controller records the transmission complete report on the recording paper with the selected printing color corresponding to the communication apparatus when the communication with the communication apparatus succeeds.

10. The communication apparatus as claimed in claim 9, wherein the recording controller sets the printing color used for outputting the transmission complete report when a transmission is completed every time when a transmission operation is performed.

11. A communication apparatus connectable to a network, comprising:

a data communication part that transmits and receives e-mail via said network;

an address directory storing part that stores an address directory including address information of a plurality of communication apparatuses to communicate with via the network, said address information including an e-mail address or an IP address of said communication apparatuses;

a recording part that prints on recording paper in one of a plurality of printing colors;

an information storing part that stores information specifying said printing color allocated for recording a reception error report for each of the communication apparatuses in the address directory;

a comparing part that compares transmitting source information transmitted from the communication apparatuses with which the communication is being established, and transmitting source information of the communication apparatus stored in the information storing part;

a printing color selector that selects the specified printing color when both sets of transmitting source information match; and a recording controller that carries out a control to record by the recording part the reception error report on recording paper with the printing color selected by said printing color selector, so that the recording controller records the reception error report on the recording paper with the selected printing color corresponding to the communication apparatus when a reception error occurs when communicating with the communication apparatus and both sets of transmitting source information match.

12. A communication apparatus connectable to a network, having a data communication function capable of transmitting data such as e-mail via said network, and a function of transmitting and receiving facsimile data using a predetermined-facsimile transmission procedure with a facsimile apparatus via a public line, comprising:

an address directory storing part that stores an address directory including transmitting destination information, a transmitting destination and identification information, said transmitting destination information being an e-mail address or an IP address of a transmitting destination to which the communication apparatus communicates via said network, said transmitting destination being a telephone number of a transmitting destination to which the communication apparatus communicates via a public line, and said identification information being identification information received from a transmitting destination when the communication apparatus calls the transmitting destination via said public line using said address directory;

a recording part that prints on recording paper in one of a plurality of printing colors;

an information storing part that stores information specifying said printing color allocated for outputting a reception error report for each facsimile apparatus in the address directory;

a comparing part that compares transmitting source information transmitted from the facsimile apparatus with which the communication is being established, with transmitting source information of the facsimile apparatus stored in said information storing part;

a printing color selector that selects the specified printing color when both sets of transmitting source information match; and a recording controller that carries out a control to record by the recording part the reception error report on recording paper with the printing color selected by said printing color selector, so that the recording controller records the reception error report on the recording paper with the selected printing color corresponding to the facsimile apparatus when a reception error occurs when communicating with the facsimile apparatus and both sets of transmitting source information match.

13. A facsimile apparatus that is connectable to at least one of a network and a public line and performs at least one of e-mail communication and data communication, and records a report indicating a result of the communication when a communication error occurs or the communication is completed, comprising:

a registering part that registers identification information of a plurality of facsimile apparatuses so that each of the facsimile apparatuses corresponds to a predetermined calling number;

a first information storing part that stores transmitting source information received from a transmitting source by dialing said calling number;

a paper feeder that feeds a recording paper and includes a plurality of paper feed stages selectively feeding recording paper, at least one of the paper feed stages having the recording paper different in color or material from the recording paper placed on the other paper feed stages;

a second information storing part that stores information specifying said paper feed stage allocated for outputting a reception error report for each of the facsimile apparatuses;

a comparing part that compares said transmitting source information transmitted from the facsimile apparatus with which the communication is established, with information of the facsimile apparatus stored in said second information storing part;

a selector that selects the specified paper feed stage when both sets of transmitting source information match;

a recording part that records information on the recording paper; and a recording controller that carries out a control to record by the recording part the reception error report on the recording paper on the paper feed stage selected by the selector, so that the selected paper feed stage corresponding to the transmitting source feeds the recording paper and the recording controller outputs the reception error report on the recording paper when a reception error occurs in the communication with the facsimile apparatus and both sets of transmitting source information match.

14. A facsimile apparatus that is connectable to either a network or a public line and performs either e-mail communication or data communication, and records a report indicating a result of communication when a communication error occurs, comprising:

a registering part that registers identification information of a plurality of facsimile apparatuses such that each of the facsimile apparatuses corresponds to a predetermined calling number;

a recording part that prints on recording paper in one of a plurality of printing colors;

an information storing part that stores information specifying said printing color allocated for outputting a reception error report for each of the facsimile apparatuses;

a comparing part that compares transmitting source information transmitted from the facsimile apparatus with the information of the facsimile apparatus stored in said information storing part;

a printing color selector that selects the specified printing color when both sets of information match; and a recording controller that carries out a control to record by the recording part the reception error report on recording paper with the printing color selected by said printing color selector, so that the recording controller records the reception error report on the recording paper with the selected printing color corresponding to the facsimile apparatus when a reception error occurs in communication with the facsimile apparatus and said transmitting source information and said identification information match.

15. A communication apparatus that is connectable to at least one of a network and a public line and performs at least one of e-mail communication and data communication, and records a report by selecting a paper feed stage or a printing color depending on a result of the communication, comprising:

a registering part that registers information of a plurality of communication apparatuses to communicate with beforehand;

a paper feeder that feeds recording paper and includes a plurality of paper feed stages selectively feeding recording paper, at least one of the paper feed stages having recording paper different in color or material from the recording paper placed on the other paper feed stages;

an information storing part that stores information specifying the paper feed stage or the printing color allocated for outputting said report for each of the communication apparatuses;

a selector that selects the specified paper feed stage or the specified printing color;

a recording part that prints on the recording paper from the specified paper feed stage selected by said selector or in the specified printing color selected by said selector; and a recording controller that carries out a control to record by the recording part the report on the recording paper selected by the selector or with the printing color selected by the selector.

\* \* \* \* \*